United States Patent Office 3,752,788
Patented Aug. 14, 1973

3,752,788
MULTICOMPONENT COPOLYMERS CONTAINING UNSATURATED ETHER COMPOUNDS AND PROCESS FOR THE PRODUCTION THEREOF
Masaaki Hirooka, Ibaragi, and Kentaro Mashita, Takatsuki, Japan, assignors to Sumitomo Chemical Company, Limited, Osaka, Japan
No Drawing. Filed Dec. 7, 1970, Ser. No. 95,985
Claims priority, application Japan, Dec. 11, 1969, 44/99,858
Int. Cl. C08f 15/40, 17/00, 19/18
U.S. Cl. 260—47 UA   12 Claims

ABSTRACT OF THE DISCLOSURE

A novel alternating multicomponent copolymer composed of at least one unsaturated ether compound as the group ($A_1$) monomer, at least one group ($A_2$) monomer selected from olefins, haloolefins, internal olefins and polyenes and at least one conjugated compound as the group (B) monomer and having a structure such that monomer units from groups ($A_1$) and ($A_2$) always alternate with monomer units from group (B). Said alternating copolymer is produced by contacting the monomers with an organoaluminum or organoboron halide.

---

The present invention relates to a multicomponent copolymer containing an unsaturated ether compound and a process for producing the same. Especially, the present invention relates to a multicomponent copolymer having an alternating sequential structure and the process for the production thereof.

The present inventors already provided a process for copolymerizing with a catalyst containing aluminum or boron at least one conjugated monomer having a nitrile or carbonyl group at a conjugated position with regard to the carbon-carbon double bond (said monomer being hereinafter referred to as the group (B) monomer) and at least one unsaturated compound selected from olefins, haloolefins, internal olefins, polyenes, acetylenes, unsaturated, esters of carboxylic acids and N—, O— or S-containing unsaturated non-conjugated compounds (said unsaturated compound being hereinafter referred to as the group (A) monomer). Said process generally produces alternating copolymers and hence has been considered to be unique as compared with conventional copolymerization reactions which had been known before said process.

Japanese patent publication No. 36,745/66 discloses that when the above unique copolymerization is effected in a system containing at least three monomers, there is produced a multicomponent copolymer in which the group (A) monomers and the group (B) monomers are alternately bonded to one another.

The present inventors have done further research on such multicomponent alternating copolymerization to find that some unsaturated ether compounds can act as the group (A) monomer in said copolymerization to produce an alternating copolymer.

The present invention provides a novel multi-component alternating copolymer of at least one monomer selected from group ($A_1$), at least one monomer selected from group ($A_2$) and at least one monomer selected from group (B), said group ($A_1$) consisting of unsaturated ether compounds having the formulas:

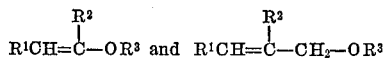

wherein $R^1$ and $R^2$ are hydrogen atoms, halogen atoms, non-polymerizable hydrocarbon groups having 1 to 20 carbon atoms, halogen-containing non-polymerizable hydrocarbon groups having 1 to 20 carbon atoms, at least one of $R^1$ and $R^2$ being a hydrogen atom, and $R^3$ is a non-polymerizable hydrocarbon group having 1 to 20 carbon atoms or a halogen-containing non-polymerizable hydrocarbon group having 1 to 20 carbon atoms, said group ($A_2$) consisting of olefinic compounds having the formulas:

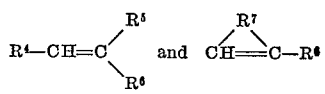

wherein $R^4$, $R^5$ and $R^6$ are hydrogen atoms, halogen atoms, hydrocarbon groups having 1 to 20 carbon atoms, or halogen-containing hydrocarbon groups having 1 to 20 carbon atoms and $R^7$ is a bivalent hydrocarbon or halohydrocarbon residue having 1 to 20 carbon atoms, and said group (B) consisting of conjugated compounds having the formula:

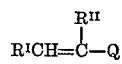

wherein $R^I$ and $R^{II}$ are hydrocarbon groups having 1 to 20 carbon atoms, halohydrocarbon groups having 1 to 20 carbon atoms, —$\bar{R}Q$ groups, halogen atoms or hydrogen atoms, at least one of $R^I$ and $R^{II}$ being a hydrogen atom, Q is a nitrile or

group in which

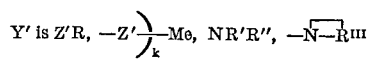

R or a halogen atom where $Z'$ is oxygen or sulfur, R, $R'$ and $R''$ are hydrogen atoms, or organic radicals having 1 to 20 carbon atoms, $R^{III}$ is a bivalent organic radical having 1 to 20 carbon atoms, Me is an ammonium radical or an element of Group I or II of Mendeleev's Periodic Table and $k$ is 1 or 2; and $\bar{R}$ is a bivalent hydrocarbon or halohydrocarbon group having 1 to 20 carbon atoms, said copolymer having a structure such that monomer units from the ($A_1$) and ($A_2$) groups alternate always with monomer units from the (B) group, each monomer unit from the ($A_1$) and ($A_2$) groups being linked only to monomer units from the (B) group and each monomer unit from the (B) group being linked only to monomer units from the ($A_1$) and ($A_2$) groups.

The present invention provides a process for producing a multicomponent copolymer of at least one monomer selected from the ($A_1$) group, at least one monomer selected from the ($A_2$) group and at least one monomer selected from the (B) group, which comprises polymerizing said monomers in the presence of at least one electron-acceptor wherein the polymerization is carried out through the coordination of at least a part of the nitrile or carbonyl group of the group (B) monomer to the electron-acceptor.

The multicomponent copolymer of the present invention is specifically produced by a method which comprises (1) contacting at least one monomer selected from the ($A_1$) group, at least one monomer selected from the ($A_2$) group and at least one monomer selected from the (B) group with an organometal halide having the formula, $MR'''_nX_{3-n}$, wherein M is aluminum or boron, $R'''$ is an ordinary organic radical, X is a halogen atom and $n$ is an arbitrary value of 1 to 2, or a mixture of at least two compounds selected from the group consisting of compounds having the formulas: $MR'''_nX_{3-n}$, $M'R^{iv}{}_3$ and $M''X'_3$, wherein M, $M'$ and $M''$ are aluminum or boron, $R'''$ and $R^{iv}$ are ordinary organic radicals, X and $X'$ are halogen atoms and $n$ is an arbitrary value of 1 to 2 or (2) contacting said monomers with (a) organic compound of a metal of Group II$^b$, III$^b$ or IV$^b$ of Mendeleev's Periodic Table and (b) a halide of a metal of Group III$^b$ or IV$^b$ of Mendeleev's Periodic Table, where at least one of (a) and (b) is a compound of boron or aluminum and (a) and (b) must be mixed at least in the presence of the group (B) monomer.

Further, said multicomponent copolymer may be produced by contacting said monomers with (I) the component used in above step (1) or the components used in above step (2) and (II) a compound having a transition metal of Groups IV$a$, V$a$, VI$a$, VII$a$ and VIII and at least one radical selected from the group consisting of halogen, alkoxy, β-diketo and acyloxy radicals were (I) and (II) must be mixed at least in the presence of the group (B) monomer and (a) and (b) are also mixed at least in the presence of the group (B) monomer. These methods may be carried out in the preesnce of a radical-generating compound, such as oxygen, an organic peroxide or an azo compound, whereby the reaction is accelerated.

Multicomponet alternating copolymers of the group (A) monomers and the group (B) monomers may preferably be produced by use of the above-mentioned catalyst system. However, in general, an electron acceptor, particularly a Lewis acid type compound, such as metal halide compound forms a complex with the group (B) monomer at its nitrile or carboxyl group whereby the reactivity of the group (B) monomer is varied appropriately, and by contacting the thus complexed monomer with the group (A) monomer, alternating bonding of said monomers can be achieved. However, some unsaturated ether compounds tend to be cationically polymerized with such a Lewis acid, and hence, the following points should be taken into consideration in order to selectively obtain multicomponent copolymers. When they tend to be cationically polymerized, a Lewis acid having a low acidity should be used as a catalyst. It is appropriate to effect the alternating copolymerization with a catalyst system with which the unsaturated ether compounds cannot be cationically polymerized. It is also effective to use the Lewis acid in a relatively small amount as compared with the group (B) monomer. Alternatively, it is effective or possible to use the unsaturated ether compound and other cationically polymerizable group (A) monomers in a smaller amount than that of the group (B) monomer. Further, it is effective to enhance the basisity in the polymerization system, and it is preferable to select monomers having no or weak cationic polymerizability. For example, a vinyl ether compound containing halogen is suitable for this purpose. In general, in order to selectively obtain an alternating copolymer, it is important to effect the copolymerization under such conditions that the respective monomers or at least one monomer cannot be homopolymerized.

The alternating copolymer of the present invention is characterized in that the group (A) monomers are alternately bonded to the group (B) monomers. That is, the group (A$_1$) or (A$_2$) monomer is always linked to only the group (B) monomer, and there is no linkage between the group (A$_1$) monomers or between the group (A$_1$) monomer and the group (A$_2$) monomer in the copolymer chain. Therefore, such a regular copolymer always contains 50 mole percent of the group (B) monomer unit, and the total sum of the amounts of the group (A$_1$) monomer unit and the group (A$_2$) monomer unit is 50 mole percent. The mutual proportion and the order of the group (A$_1$) monomer unit and the group (A$_2$) monomer unit are optional and can be varied depending upon the reactivities of the respective monomers and the ratio of the concentrations of the monomers in the reaction system. However, under some conditions that there is a possibility of each monomer being homopolymerized, the alternating regulation may be occasionally weakened.

The group (A$_2$) monomer used in the present invention includes all unsaturated ether compounds having the formula:

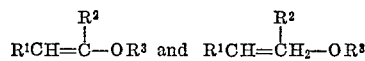

wherein R$^1$, R$^2$ and R$^3$ are as defined above. The halogen atom used as R$^1$, R$^2$ or R$^3$ includes chlorine, bromine, iodine and fluorine. The hydrocarbon group which may be used as R$^1$, R$^2$ or R$^3$ includes all hydrocarbon groups free from such a double bond as opened by the polymerization reaction in the present invention. As these hydrocarbon groups, preferable are, for example, alkyl, aryl, aralkyl, alkylaryl, cycloalkyl and the like and those groups substituted by halogen. Halogen-containing unsaturated ether compounds having low cationic polymerizability are particularly suitab'e for selectively obtaining copolymers without cationic polymers as by-products. Further, from the standpoint of the regularity of alternating sequence and the copolymerizability, there are preferred monomers having an $e$-value of not more than 1.0 particularly not more than 0.5 on the Price-Alfrey monomer reactivity index Q-$e$.

Examples of these unsaturated ether compounds are vinyl methyl ether, isopropenyl methyl ether, vinyl chloromethyl ether, β-chlorovinyl methyl ether, β-bromovinyl methyl ether, isopropenyl ethyl ether, β-chlorovinyl ethyl ether, vinyl 2-chloroethyl ether, vinyl 3-chloropropyl ether, vinyl 2-bromoethyl ether, vinyl trifluoroethyl ether, vinyl isopropyl ether, vinyl 4-chlorobutyl ether, β-chlorovinyl butyl ether, vinyl isobutyl ether, vinyl t-butyl ether, vinyl neopentyl ether, vinyl 2-ethylhexyl ether, vinyl octyl ether, vinyl cyclohexyl ether, vinyl phenyl ether, α-chlorovinyl phenyl ether, vinyl p-methylphenyl ether, vinyl p-chlorophenyl ether, α-bromovinyl phenyl ether, vinyl 2-chlorophenyl ether, vinyl 2,4-dichlorophenyl ether, vinyl 2,3,4-trichlorophenyl ether, vinyl α-naphthyl ether, vinyl benzyl ether, vinyl p-chlorobenzyl ether, vinyl α,α-dimethylbenzyl ether, allyl methyl ether, allyl ethyl ether, allyl 2-chloroethyl ether, allyl isopropyl ether, allyl isobutyl ether, allyl octyl ether, allyl p-chlorophenyl ether, allyl α-naphthyl ether, allyl benzyl ether, methallyl methyl ether, methallyl 2-chloroethyl ether, methallyl propyl ether, methallyl butyl ether and the like.

The group (A$_2$) monomer used in the present invention includes all compounds represented by the formula:

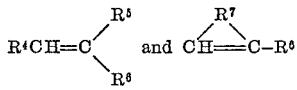

wherein R$^4$, R$^5$, R$^6$ and R$^7$ are the same as defined above. These compounds may be α-olefins having the formula:

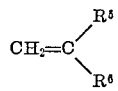

wherein R$^5$ and R$^6$ are the same as defined above, internal olefinic compounds having the formula:

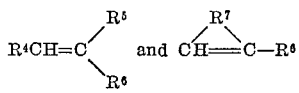

wherein R$^4$, R$^5$, R$^6$ and R$^7$ are the same as defined above, and polyenic compounds having said formulas in which R$^5$ and/or R$^6$ have at least one double bond, and haloolefinic compounds derived by substituting these olefinic compounds by halogen. The halogen used as R$^4$, R$^5$ and R$^6$ includes chlorine, bromine, iodine, and fluorine, and the hydrocarbon group for the R's includes alkyl, alkenyl, aryl, aralkyl, aralkenyl, alkylaryl, alkenylaryl, cycloalkyl, cycloalkenyl, and polycyclic hydrocarbon groups. Groups derived by substituting these groups by halogen may preferably be used too.

As the terminally unsaturated olefinic compounds, there are olefins, such as ethylene, propylene, butene-1, isobutene, hexene-1, heptene-1, 2-methylbutene-1, 2-methylpentene-1, 4-methylpentene-1, octadecene-1, 4-phenylbutene-1, styrene, α-methylstyrene, α-butylstyrene, 4-methylstyrene, vinylcyclobutane, vinylcyclohexane, isopropenylbenzene, vinylnaphthalene, allylbenzene, etc.; and halogen-containing olefinically unsaturated compounds, such as vinyl chloride, vinyl bromide, allyl chloride, allyl bromide, allyl iodide, 4-chloro-butene-1,3-chlorobutene-1, 3-bromo-pentene-1, 4-chloro-styrene, 4-iodostyrene, 4-chloro-vinylcyclohexane, 4-chloro-allylbenzene, 2,4-dichlorostyrene, 2,4-di-fluoro-styrene, 4-chloro-1 vinylnaphthalene, vinylidene chloride, vinylidene bromide, 2-chloro-propene-1, 1-bromo-1-chloro-ethylene, 2-chloro-allyl chloride, methallyl chloride, 1,1-bis-(4-chlorophenyl)-ethylene, etc.

As the internal olefins which belong to the second group of the $(A_2)$ group monomer, as is clear from the formulas, there are 1,2-di-substituted or 1,2,2-trisubstituted ethylenically unsaturated hydrocarbons and halogen-containing unsaturated hydrocarbons, and linear and cyclic olefins are included therein. As the cyclic olefins, there may be used not only monocyclic compounds but also polycyclic compounds and bridged ring compounds.

Examples of these compounds are butene-2, 2-methyl-butene-2, hexene-2, hexene-3, 2-methylpentene-2, heptene-2, octadecene-2, γ-methallyl chloride, 1,5-dichloro-pentene-2, 1-chloro-3-methylbutene-2, 1-chloromethyl-butene-2, β-methylstyrene, 4-phenylbutene-2, α,β-dimethylstyrene, β,β-dimethylstyrene, 1,1-diphenylpropene-1, stilbene, α-methylstilbene, α-methyl-4-chlorostyrene, α-chloromethylstyrene, 2-propenylnaphthalene, 1 - cyclohexylpropene-1, cyclopentene, cycloheptene, 1-methyl-cyclobutene-1, 4-chloro-cyclohexene, indene, 2-bromo-indene, 3-methylindene, dihydronaphthalene, acenaphthylene, norbornene, 5-methylnorbornene, 5-phenylnorbornene, 5-chloronorbornene, 5,6-dichloronorbornene, 7-chloronorbornene, 2 - methylnorbornene, γ-fenchene, bornylene, 5-chloromethylnorbornene, endocamphene, α-pinene and myrcenyl chloride.

As the polyenic compounds which belong to the third group of the $(A_2)$ group monomer, there may be used polyolefinic compounds, such as dienes, trienes, tetraenes and the like. Particularly, it is important that at least one double bond of said compounds has at least two hydrogen atoms. In general, there are often used polyenic compounds having 4 to 30 carbon atoms. These polyenic compounds may have substituents which do not inhibit the polymerization reaction, such as halogen.

Examples of these compounds are 1,3-butadiene, isoprene, 1,3-pentadiene, 1,4-pentadiene, 1,4-hexadiene, 1,5-hexadiene 2,3-dimethyl-1,3-butadiene 11-ethyl-1,11-tridecadiene, myrcene, 1,3,5-hexatriene, α-chloro-1,3-butadiene, 3-fuoro-1,4-hexadiene, p-divinylbenzene, p-isopropenylstyrene, diallylcyclohexane, trivinylcyclohexane, 4-vinylcyclohexene-1, 2-methylallylcyclopentene - 1, 3-allylindene, 4,7,8,9 - tetrahydroindene, bicyclo-(4,2,0)-octadiene-2,7, fulvene, 1,3-cyclopentadiene, 5-chloro-1,3-pentadiene, 1,5-cyclooctadiene, 1,3,5-cycloheptatriene, Δ2,2'-dicyclopentenyl, dicyclopentadiene, 2,5-norbornadiene, 5-methylene-2-norbornene, 5-vinyl-2-norbornene, 5-isopropenyl-2-norbornene, 2-vinyl - 1,4 - endomethylene-1,2,3,4,5,5a,8,8a-octahydronaphthalene, limonene, dipentene and the like.

These monomers of group $(A_2)$, according to the Price-Alfrey monomer reactivity index Q-e concept have generally e-values of not more than 1.0, and monomers having an e-value of not more than 0.5, particularly a minus e-value tend to give good results.

The group (B) monomers used in the present invention are conjugated compounds having the formula:

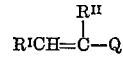

wherein Q is a nitrile or $$-\underset{\underset{O}{\|}}{C}-Y'$$

group in which Y' is the same as defined above.

As the ordinary organic groups having 1 to 20 carbon atoms for R, R' and R'' in Y', preferable are ordinary hydrocarbon groups and derivatives thereof, for example, alkyl, aryl, aralkyl, alkylaryl, and cycloalkyl. The halogen for Y' includes chlorine, bromine, iodine and fluorine. Me is the element of Groups I to III of Mendeleev's Periodic Table or is an ammonium radical. As the element, there may be used, for example, lithium, sodium, potassium, rubidium, cesium, copper, silver, beryllium, calcium, strontium, barium, magnesium, zinc, cadmium, mercury and the like. In the case of $k=2$, it corresponds to

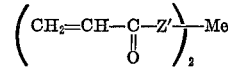

Among these compounds, monovalent salts, that is, salts of the Group I elements and ammonium salts are particularly preferable.

As the

group, there may be used, for example,

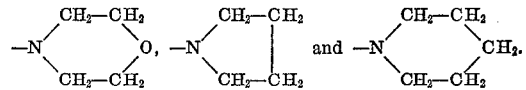

That is, hydrocarbon groups, such as morpholino, pyrrolidino and piperidino, or any groups containing hetero atoms, such as nitrogen, oxygen or halogen may be used.

In the case where $R^I$ and $R^{II}$ both are hydrogen atoms, the group (B) monomers are acrylonitrile, acrylic compounds and thiolacrylic compounds, which include acrylic acid esters, thiolacrylic acid esters, acrylamide, N-substituted acrylamides, N,N-di-substituted acrylamides, acrylic acid halides, acrylic acid, thiolacrylic acid, salts of these acids, acrolein, vinyl ketones and the like.

In the case where both $R^I$ and $R^{II}$ are not hydrogen atoms, either of them is a hydrocarbon group, a halogen-containing hydrocarbon group, a —$\bar{R}Q$ group or halogen. As the hydrocarbon group, alkyl, aryl, aralkyl, alkylaryl and cycloalkyl are often used. The $\bar{R}Q$ group is a hydrocarbon group having a terminal nitrile or

group and is not conjugated with the C=C bond to which $R^I$ and $R^{II}$ are attached. As the hydrocarbon group $\bar{R}$, any hydrocarbon group having 1 to 20 carbon atoms may be used. Particularly preferable are alkylene groups having 1 to 6 carbon atoms, for instance, methylene, ethylene, methylmethylene, propylene, isopropylene, butylene, cyclohexylene and the like.

The halogen for $R^I$ and $R^{II}$ or for the halohydrocarbon for $R^I$ and $R^{II}$ includes chlorine, bromine, iodine and fluorine.

The compounds having such $R^I$ and $R^{II}$ are α- or β-substituted acrylonitrile, acrylic and thiolacrylic compounds.

Specific examples of the group (B) monomers are methyl acrylate, ethyl acrylate, n-butyl acrylate, n-amyl acrylate, octadecyl acrylate, allyl acrylate, o-tolyl acrylate, benzyl acrylate, cyclohexyl acrylate, 2-chloroethyl acrylate, β-chloroallyl acrylate, methyl thiolacrylate, ethyl thiolacrylate, acrylamide, N-methylacrylamide, N-n-butyl acrylamide, N-2-ethylhexyl acrylamide, N-stearyl acrylamide, N-cyclohexyl acrylamide, N-tolyl acrylamide, N,N-dimethyl acrylamide, N-methyl-N-ethyl acrylamide, acrylyl morpholine, acrylyl pyrrolidine, acryloyl chloride, acryloyl bromide, acrylic acid, thiolacrylic acid, sodium acrylate, potassium acrylate, zinc acrylate, ammonium acrylate, acrolein, methyl vinyl ketone, ethyl vinyl ketone, phenyl vinyl ketone (these being α- or β-non-substituted compounds), methyl methacrylate, ethyl methacrylate, butyl methacrylate, octadecyl methacrylate, benzyl methacrylate, phenyl methacrylate, tolyl methacrylate, cyclohexyl methacrylate, 2-chloroethyl methacrylate, methyl thiolmethacrylate, ethyl thiolmethacrylate, methyl α-ethylacrylate, ethyl α-butylacrylate, methyl α-cyclohexylacrylate, methyl α-phenylacrylate, methyl α-chloroacrylate, methyl α-chloromethylacrylate, methyl α - (p - chlorophenyl)-acrylate, methacrylamide, N-ethylmethacrylate, N-cyclohexyl methacrylamide, N,N-dimethyl methacrylamide methacrylyl piperidine, α-ethyl acrylamide, α-chloroacrylamide, α-chloromethyl acrylamide, methacryloyl chloride, α-chloroacryloyl chloride, α-ethylmethacryloyl chloride, methacrylic acid, thiolmethacrylic acid, sodium methacrylate, zinc methacrylate, ammonium α-fluoroacrylate, methacrolein, methyl isopropenyl ketone, 1-chloro-butenyl ethyl ketone, methacrylonitrile, α-ethylacrylonitrile, α-cyclohexylacrylonitrile, α-chloroacrylonitrile, α-chloromethylacrylonitrile, ethyl crotonate, phenyl crotonate, crotonamide, crotonoyl chloride, crotonitrile, methyl cinnamate, butyl cinnamate, chloromethyl cinnamate, cinnamic nitrile, methyl β-chloromethylacrylate, methyl β-cyano-β-methylenepropionate, 2-chloroethyl β-cyano-β-methylenepropionate, monomethyl itaconate, diisopropyl itaconate, sodium itaconate, α-methylene glutaronitrile, N,N-dimethyl-α-methylene glutaroamide, dimethyl α-methylenesuccinate, di-2-ethylhexyl glutaconate, ethyl γ-cyanocrotonate, n-butyl γ-N,N-dimethylamidocrotonate, β - cyanomethyl-N-methyl acrylamide and the like (these being α- or β-substituted compounds).

Interesting combinations of monomers in the present invention are those of halogen-containing unsaturated ether compounds, such as 2-chloroethyl vinyl ether, 3-chloropropyl vinyl ether, etc. as the group ($A_1$) monomer, α-olefins, such as isobutylene and propylene as the group ($A_2$) monomer and acrylic acid esters, acrylic acid or acrylonitrile as the group (B) monomer.

In order to obtain a multicomponent alternating copolymer according to the present invention, the group (B) monomer is complexed with the electron acceptor to further reduce the electron density of the double bond, and the thus complexed group (B) monomer is copolymerized with the group (A) monomer. The complexing catalyst system mentioned above is suitable for this purpose.

The catalyst component (I) used in the present invention is (1) a compound having the formulas: $MR'''_nX_{3-n}$, $M'R^{iv}_3$ or $M''X'_3$ wherein M, M' and M'' are aluminum or boron, R''' and $R^{iv}$ are ordinary organic radicals, X and X' are halogen and n is an arbitrary value of 1 to 2, or (2)(a) an organic compound of a metal of Group IIb, IIIb or IVb of Mendeleev's Periodic Table and (b) a halide of a metal of Group IIIb or IVb of Mendeleev's Periodic Table.

In the aluminum or boron compounds having the formulas: $MR'''_nX_{3-n}$, $M'R^{iv}_3$ and $M''X'_3$, hydrocarbon or halohydrocarbon groups having 1 to 20 carbon atoms are particularly preferable for R''' and $R^{iv}$, and those groups having inert substituents may effectively be employed. For example, alkyl, alkenyl, aryl, aralkyl, alkylaryl or cycloalkyl is preferable. Specifically, methyl, ethyl, propyl, butyl, hexyl, octyl, decyl, dodecyl, stearyl, phenyl, tolyl, naphthyl, benzyl, cyclopentadienyl and cyclohexyl may be exemplified. For X and X', there may be employed chlorine, bromine, iodine and fluorine.

Specific examples of these compounds are methylaluminum dichloride, ethylaluminum dichloride, isobutylaluminum dichloride, hexylaluminum dichloride, dodecylaluminum dichloride, phenylaluminum dichloride, cyclohexylaluminum dichloride, methylaluminum dibromide, ethylaluminum diiodide, allylaluminum dichloride, ethylaluminum sesquichloride, ethylaluminum sesquibromide, ethylaluminum sesquifluoride, methylaluminum sesquichloride, diethylaluminum fluoride, ethylphenylaluminum chloride, dicyclohexylaluminum chloride, methylboron dichloride, ethylboron dichloride, ethylboron diiodide, butylboron dichloride, hexylboron dichloride, dodecylboron dichloride, phenylboron dichloride, benzylboron dichloride, cyclohexylboron dichloride, diethylboron bromide, dipropylboron chloride, dibutylboron chloride, dihexylboron chloride, ethylvinylboron chloride, dicyclopentadienylboron chloride for the formula, $MR'''_nX_{3-n}$ including $MR'''_{1.5}X_{1.5}$, $MR'''_2X$ and $MR'''X_2$; trimethylaluminum, triethylaluminum, tripropylaluminum, tributylaluminum, trihexylaluminum, tridecylaluminum, triphenylaluminum, trihexylaluminum, tribenzylaluminum, trimethylboron, triethylboron, tributylboron, trihexylboron, diethylphenyloboron, diethyl-p-tolylboron, tricyclohexylboron for the formula, $M'R^{iv}_3$; and aluminum trichloride, aluminum tribromide, aluminum triiodide, partially fluorinated aluminum chloride, boron trichloride, boron tribromide, and boron triiodide for the formula, $M'X_3$.

Of these compounds, preferable are the $AlR'''_nX_{3-n}$ and $BR'''_nX_{3-n}$ type compounds. Especially alkylaluminum dihalides, alkylaluminum sesquihalides, dialkylaluminum halides, alkylboron dihalides and dialkylboron halides are preferable. In particular, the $BR'''_nX_{3-n}$ compounds are poor in cationic property, and hence, the production of cationic polymer of the unsaturated ether can be avoided. Further, the use of said boron compound brings about a high catalyst efficiency. Said boron compounds are excellent in these respects.

The metal in the organic compound of a metal of Groups IIb, IIIb or IVb which is the (a) component of catalyst (2) includes zinc, mercury, boron, aluminum, gallium, indium, thallium, germanium, tin, lead and the like, and particularly, zinc, boron, aluminum and tin are often used. As the organic radical of said compound, ordinary hydrocarbon or halohydrocarbon groups having 1 to 20 carbon atoms are preferable. In particular, alkyl, alkenyl, aryl, aralkyl, alkylaryl, and cycloalkyl are effective. The organometallic compound may have other groups than the metal and the organic radical. Particularly, an organometallic compound having the formula: $M'''R^v_nX''_{p-n}$ wherein M''' is a metal of Groups IIb, IIIb and IVb of Mendeleev's Periodic Table, $R^v$ is a hydrocarbon group having 1 to 20 carbon atoms or a derivative thereof, X'' is a halogen atom, p is the valency of the metal and n is an arbitrary value of from 1 to p is useful. In general, the compound in which n is p, that is, a compound having the formula, $M'''R^v_p$ is particularly effective. If necessary, other organometallic compounds of a metal of Groups IIb, IIIb and IVb of Mendeleev's Periodic Table may, of course, be used. Examples of these organometallic compounds are diethylzinc, ethylzinc chloride, diethylcadmium, diethylmercury, diphenylmercury, triethylboron, tributylboron, tricyclohexylboron, diethylboron bromide, triethylaluminum, tributylaluminum, trihexylaluminum, tricyclohexylaluminum, vinyldiethylaluminum, diethylaluminum chloride, ethylaluminum sesquichloride, ethylaluminum dichloride, trimethylgallium, triethylgallium, triethylindium, tetraethyl germanium, tetramethyltin, tetraethyltin, tetraisobutyltin, dimethyldiethyltin, tetraphenyltin, tetrabenzylin, diethyldiphenyltin, triethyltin chloride, diethyltin dichloride, ethyltin trichloride, tetramethyllead, tetraethyllead, dimethylethyllead, triethyllead chloride, and the like.

The metal halide used as the (b) component of catalyst (2) is a halide of a metal of Group IIIb or IVb of Mendeleev's Periodic Table, including, for example, boron, aluminum, gallium, indium, thallium, germanium, tin and lead. As the halogen, chlorine, bromine, iodine and fluorine may be used. The metal halide may have a group other than halogen. Particularly preferable metal halides are compounds having the formula,

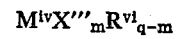

wherein $M^{iv}$ is a metal of Group IIIb or IVb of Mendeleev's Periodic Table, X''' is a halogen atom, $R^{vi}$ is a hydrocarbon or halohydrocarbon group having 1 to 20 carbon atoms or a derivative thereof, q is the valency of the metal and m is an arbitrary value of from 1 to q, and in general, a compound having said formula in which $m$ is $p$, i.e., a compound having the formula, $M^{iv}X'''_q$ yields a good result. If necessary, other halides of a metal of Group IIIb or IVb may, of course, be employed. Examples of useful metal halides are boron trichloride, boron trifluoride, boron tribromide, boron triiodide, ethylboron dichloride, diethylboron chloride, aluminum trichloride, aluminum tribromide, aluminum triiodide, partially fluorinated aluminum chloride, ethylaluminum dichloride, methylaluminum dibromide, ethylaluminum sesquichloride, diethylaluminum chloride, gallium trichloride, gallium dichloride, germanium tetrachloride, tin tetrachloride, tin tetrabromide, tin tetraiodide, ethyltin trichloride, methyltin trichloride, phenyltin trichloride, dimethyltin dibromide, diethyltin dichloride, diisobutyltin dichloride, triethyltin chloride, lead tetrachloride, diethyllead dichloirde, and the like.

When a combination of an organic compound of a metal of Group IIb, IIIb or IVb of Mendeleev's Periodic Table and a halide of a metal of Group IIIb or IVb of the same Periodic Table is employed as catalyst (2), the two are used without being previously mixed with each other. The mixing of the two components is effected in the presence of at least the group (B) monomer. A good result can be obtained by first mixing the conjugated vinyl compound with the metal halide and then adding to the mixture the organometallic compound.

The compound of a transition metal of Groups IVa, Va, VIa, VIIa or VIII of Mendeleev's Periodic Table used as component (II) in the present invention has at least one radical selected from the group consisting of halogen, alkoxy, β-diketo and acyloxy radicals, and the alkoxy radical includes radicals represented by the formula, $R^aO-$ in which $R^a$ is an ordinary hydrocarbon or halohydrocarbon group or a derivative thereof, and the β-diketo radical and the acyloxy radical are represented by the formulas,

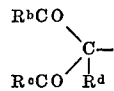

and

respectively, wherein $R^b$, $R^c$, $R^d$ and $R^e$ are hydrocarbon or halohydrocarbon groups or derivatives thereof. As the halogen, preferable are chlorine, bromine and iodine. As the β-diketo radical, acylacetonyl radical, particularly acetylacetonyl radical and benzoylacretonyl radical are preferable. The hydrocarbon group in these radicals may be any hydrocarbon group. For instance, alkyl, aryl, aralkyl, alkylaryl, cycloalkyl or the like. Particularly preferable are those having 1 to 20 carbin atoms. The transition metal of Groups IVa, Va, VIa, VIIa and VIII includes titanium, zirconium, vanadium, chromium, molybdenum, tungsten, manganese, iron, cobalt, nickel, palladium, rhodium and platinum. Of these metals, titanium, zirconium, vanadium, chromium, iron, cobalt and nickel are preferable. In particular, vanadium and cobalt yield a good result. It is sufficient that said transition metal compound has at least one radical selected from halogen, alkoxy, β-diketo and acyloxy radicals, and compounds having these radicals in combination or together with other radicals may be employed.

Specific examples of these compounds are titanium tetrachloride, titanium trichloride, diethoxytitanium dichloride, n-butyl orthotitanate, dititanium diacetylacetonate hexachloride, dicyclopentadienyltitanium dichloride, zirconium tetrachloride, zirconium tetraacetylacetonate, vanadium tetrachloride, vanadyl trichloride, triethyl orthovanadate, vanadylethoxy dichloride, vanadylamyloxy monochloride, vanadium trisacetylacetonate, vanadium tribenzoylacetonate, vanadyl diacetylacetonate, vanadyl acetylacetonate dichloride, dicyclopentadienylvanadium dibromide, vanadium acetate, vanadium stearate, chromium trichloride, chromium trisacetylacetonate, manganese trisacetylacetonate, manganese bisacetylacetonate, manganese tetrachloride, manganese dichloride, manganese stearate, manganese naphthenate, iron trichloride, iron trisacetylacetonate, cobalt dichloride, cobalt trisacetylacetonate, cobalt naphthenate, cobalt stearate, nickel dichloride, nickel diacetylacetonate, nickel stearate, and the like.

In the process of the present invention, the concentration and the proportion of the catalyst components used may be varied in a wide range depending upon the kind of monomer and other conditions. The aluminum or boron compound is often used in a proportion of 0.0005 to 10 mole, preferably 0.001 to 1 mole per mole of the group (B) conjugated compound. When the transition metal compound of component (II) is used, the yield of copolymer per unit amount of catalyst is considerably enhanced, and by suitably selecting the conditions, at least one mole, particularly 2 to 500 moles or more of the group (B) conjugated compound can be copolymerized per mole of the aluminum or boron compound.

In the case of catalyst (I) (2), the components (a) and (b) are mixed in the presence of the group (B) conjugated compound as in the prior art, and the (II) component transition metal halide may be mixed therewith simultaneously with or after mixing the components (a) and (b). The proportion of the component (II) to the component (I) depends on activity. In general, the (II) component is used in a proportion of 0.001 to 10 moles per mole of the (I) component, and when it is used in a proportion of 0.01 to 1 mole per mole of the (I) component, a particularly good result is obtained. The (I) and (II) components are mixed with each other in the presence of at least the group (B) monomer and the group (A) monomer may be added at any time.

The process of the present invention can be carried out in the presence of an appropriate amount of oxygen or an organic peroxide, or if necessary, an azo compound may be used. The copolymerization can be accelerated by adding these compounds, but the addition of them in excess, in some cases, retards the reaction.

In general, a good result is obtained when oxygen, an organic peroxide or an azo compound is added in an amount smaller than the amount of the catalyst components used. For example, they are often employed in an amount of 0.01 to 100 mole percent, particularly 0.1 to 20 mole percent, based on the aluminum or boron compound as the catalyst. Further, the proportion of oxygen, an organic peroxide or an azo compound to the group (B) monomer is 0.001 mole percent or more, particularly effectively more than 0.01 mole percent. For instance, it is 0.001 to 20 mole percent, preferably 0.01 to 5 mole percent. The organic compound which may be used in the present invention includes all organic compounds having a peroxide linkage, for example, diacyl peroxides, ketone peroxides, aldehyde peroxides, ether peroxides, hydroperoxides, dihydrocarbyl peroxides, peracid esters, dihydrocarbyl percarbonates, percarbamates and the like. Examples of these compounds are benzoyl peroxide, lauroyl peroxide, acetyl peroxide, methylethylketone peroxide, t-butyl hydroperoxide, cumene hydroperoxide, di-t-butyl peroxide, dicumyl peroxide, t-butyl perbenzoate, t-butyl peracetate, phenyl percarbamate and the like. As the azo compound, there may be used any radical generating material, such as 2,2'-azobisisobutyronitrile, diazoaminobenzene, 1,1'-azobisphenylethane, and generally, the higher the rate of radical decomposition, the more effective. However, care should be paid since when these compounds are used too much, the alternating regulation may be reduced. When it is desired to sufficiently keep the alternating regulation, it is preferable to effect the polymerization at a low temperature. On the other hand, the azo compound accelerates the reaction at relatively high temperatures.

In the present invention, the polymerization temperature may be any of from such a low temperature as $-150°$ C. to such a high temperature as +100° C., though it is generally −80° C. to +70° C. and preferably −30° to +40° C.

The polymerization may be effected under any pressure of from reduced pressure or a state diluted with an inert gas to 100 kg./cm.$^2$, though in many cases, the reaction sufficiently effectively proceeds under about normal pressure.

In the process of the present invention, bulk polymerization may be effected in liquid monomer or solution polymerization may also be effected in an ordinary inert solvent. As this solvent, ordinary hydrocarbons or halogen-containing hydrocarbons may be used. For example, propane, butane, pentane, hexane, heptane, octane, ligroin, petroleum ether, other petroleum mixed solvents, benzene, toluene, xylene, cyclohexane, methylcyclohexane, methyl dichloride, ethylene dichloride, trichloroethylene, tetrachloroethylene, butyl chloride, chlorobenzene, bromobenzene and the like may be used. Such solvents as form a complex with the catalyst components are not desired.

After the completion of polymerization, an after-treatment is effected in a conventional manner to purify and recover the thus produced polymer. As said after-treatment, there may be used alcohol treatment, alcohol-hydrochloric acid treatment, hydrochloric acid-water treatment, alkali treatment or other conventional after-treatments used for cationic polymerization with a Lewis acid or polymerization with a Ziegler-Natta catalyst. However, it is also possible to add a compound capable of forming a complex with the catalyst components without decomposing the components to separate and recover the same from the polymerization product.

The multicomponent copolymers according to the present invention are useful as materials for the production of elastomer, film, fiber and molded articles.

The present invention is specifically explained by reference to examples hereinafter, which are by way of illustration and not by way of limitation.

EXAMPLE 1

Into a 2-l. glass separable flask was liquefied 8 moles of isobutylene at −78° C. under an argon stream and 133 millimoles of ethylboron dichloride (1 millimole/ml., 133 ml. of n-heptane solution) was added thereto, after which the temperature was elevated to −20° C. Into the flask was charged a mixture of 4 moles of butyl acrylate and 0.4 mole of 2-chloroethyl vinyl ether with stirring and reaction was effected for 10 min., after which methanol was added to the reaction mixture to stop the reaction. The contents were subjected to mixer treatment together with a large amount of methanol and then dried under reduced pressure to obtain 436 g. of a white amorphous copolymer. The intrinsic viscosity of the copolymer was found to be 3.55 dl./g. by measuring the viscosity of its benzene solution at 30° C. The values of elementary analysis were as follows: C, 68.26%; H, 10.40%; O, 18.22%; Cl, 2.21%. From these values, it was found that the copolymer consisted of 50.8 mole percent of butyl acrylate, 43.3 mole percent of isobutylene and 5.9 mole percent of 2-chloroethyl vinyl ether.

EXAMPLE 2

Into a 200-ml. glass separable flask was liquefied 800 millimoles of isobutylene at −78° C. under an argon stream, and 13.3 millimoles of ethylboron dichloride (1 millimole/ml., n-heptane solution) was added thereto. Into the flask was then charged a mixture of 400 millimoles of ethyl acrylate and 20 millimoles of 2-chloroethyl vinyl ether at −50° C., and reaction was effected for 3 hrs. to obtain 44.8 g. of a copolymer. The values of elementary analysis of this copolymer were as follows: C. 65.73%; H, 10.08%; O, 20.76%; Cl, 1.57%. From these values, it was found that the copolymer consisted of 51.4 mole percent of ethyl acrylate, 44.5 mole percent of isobutylene and 4.1 mole percent of 2-chloroethyl vinyl ether.

EXAMPLE 3

Into a 50-ml. glass reaction tube were charged at −20° C. 20 millimoles of acrylonitrile, 20 millimoles of styrene, 1.5 millimoles of isobutyl vinyl ether, 10 ml. of toluene, 0.1 millimole of benzoyl peroxide and 10 millimoles of ethylaluminum sesquichloride in this order, and reaction was effected for 5 hrs. to obtain 1.87 g. of a copolymer consisting of 48.6 mole percent of acrylonitrile, 4.2 mole percent of isobutyl vinyl ether and 47.2 mole percent of styrene.

EXAMPLE 4

Into a 50-ml. glass reaction tube were charged at −78° C. under an argon stream 30 millimoles of methyl acrylate, 15 millimoles of tin tetrachloride, and 15 millimoles of triethylaluminum in this order, after which 3 millimoles of allyl phenyl ether and 20 millimoles of vinylidene chloride were added thereto and reaction was effected for 5 hrs. to obtain 0.84 g. of a copolymer consisting of 47.9 mole percent of methyl acrylate, 3.8 mole percent of allyl phenyl ether and 48.3 mole percent of vinylidene chloride.

EXAMPLE 5

Into a 50-ml. glass reaction tube was liquefied 160 millimoles of isobutylene at −78° C. under an argon stream, and 10 ml. of a toluene solution containing 0.8 millimole of cobalt trisacetylacetonate was then added thereto. The temperature was elevated to −20° C., after which a mixture of 16 millimoles of 2-chloroethyl vinyl ether, 16 millimoles of isoprene and 80 millimoles of ethyl acrylate was added and 16 millimoles of ethylboron dichloride (1 millimole/ml., 16 ml. of n-heptane solution) was then added. Reaction was effected for 5 hrs. to obtain 12.12 g. of a copolymer. The iodine value of the copolymer was 29.8. It was confirmed from this iodine value and elementary analysis values that the composition of the copolymer was as follows: ethyl acrylate 47.8 mole percent, isobutylene 36.1 mole percent, isoprene 9.7 mole percent and 2-chloroethyl vinyl ether 6.4 mole percent. That is, the copolymer was a four component copolymer containing 48 mole percent of the group (B) monomer and 52 mole percent of the group (A) monomer and having alternating sequence containing (A) and (B).

The same procedure as above was repeated except that acrylic acid was substituted for the ethyl acrylate to obtain a similar copolymer.

What is claimed is:
1. A multicomponent copolymer consisting essentially of alternating sequential units derived from each of monomer groups $(A_1)$, $(A_2)$ and (B), said group $(A_1)$ consisting of unsaturated ether compounds having the formulas:

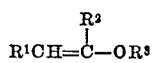

and

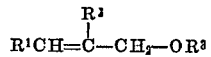

wherein $R^1$ and $R^2$ are hydrogen atoms, halogen atoms, nonpolymerizable hydrocarbon groups having 1 to 20 carbon atoms, halogen-containing, non-polymerizable hydrocarbon groups having 1 to 20 carbon atoms, at least one of R¹ and R² being a hydrogen atom, and R³ is a non-polymerizable hydrocarbon group having 1 to 20 carbon atoms or a halogen-containing non-polymerizable hydrocarbon group having 1 to 20 carbon atoms, said group (A₂) consisting of olefinic compounds having the formulas:

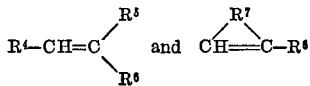

wherein R⁴, R⁵ and R⁶ are hydrogen atoms, halogen atoms, hydrocarbon groups having 1 to 20 carbon atoms or halogen-containing hydrocarbon groups having 1 to 20 carbon atoms and R⁷ is a bivalent hydrocarbon or halohydrocarbon residue having 1 to 20 carbon atoms, and said group (B) consisting of conjugated compounds having the formula:

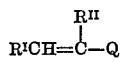

wherein R^I and R^II are hydrocarbon groups having 1 to 20 carbon atoms, halohydrocarbon groups having 1 to 20 carbon atoms, —RQ groups, halogen atoms or hydrogen atoms, at least one of R^I and R^II being a hydrogen atom, Q is a nitrile or

group in which

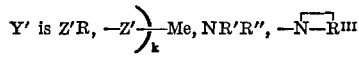

R or a halogen atom where Z' is oxygen or sulfur, R, R' and R'' are hydrogen atoms or organic radicals having 1 to 20 carbon atoms, R^III is a bivalent organic radical having 1 to 20 carbon atoms, Me is an ammonium radical or an element of Group I or II of Mendeleev's Periodic Table and $k$ is 1 or 2; and $\bar{R}$ is a bivalent hydrocarbon or halohydrocarbon group having 1 to 20 carbon atoms, said alternating sequential units having a structure such that monomer units from the (A₁) and (A₂) groups substantially alternate with monomer units from the (B) group, each monomer unit from the (A₁) and (A₂) groups being linked only to monomer units from the (B) group and each monomer unit from the (B) group being linked only to monomer units from the (A₁) and (A₂) groups wherein said polymer contains approximately 50 percent of said (A₁) and (A₂) groups.

2. An alternating multicomponent copolymer according to claim 1, wherein the (A₁) group consists of vinyl methyl ether, isopropenyl methyl ether, vinyl chloromethyl ether, β-chlorovinyl methyl ether, β-bromovinyl methyl ether, isopropenyl ethyl ether, β-chlorovinyl ethyl ether, vinyl 2-chloroethyl ether, vinyl trifluoroethyl ether, vinyl 2-bromoethyl ether, vinyl isopropyl ether, vinyl 4-chlorobutyl ether, β-chlorovinyl butyl ether, vinyl isobutyl ether, vinyl t-butyl ether, vinyl neopentyl ether, vinyl 2-ethylhexyl ether, vinyl octyl ether, vinyl cyclohexyl ether, vinyl phenyl ether, α-chlorovinyl phenyl ether, vinyl p-methylphenyl ether, vinyl p-chlorophenyl ether, α-bromovinyl phenyl ether, vinyl 2-chlorophenyl ether, vinyl 2,4-dichlorophenyl ether, vinyl 2,3,4-trichlorophenyl ether, vinyl α-naphthyl ether, vinyl benzyl ether, vinyl p-chlorobenzyl ether, vinyl α,α-dimethyl benzyl ether, allyl methyl ether, allyl ethyl ether, allyl 2-chloroethyl ether, allyl isopropyl ether, allyl isobutyl ether, allyl octyl ether, allyl p-chlorophenyl ether, allyl α-naphthyl ether, allyl benzyl ether, methallyl methyl ether, methallyl 2-chloroethyl ether, methallyl propyl ether and methallyl butyl ether.

3. An alternating multicomponent copolymer according to claim 1, wherein the group (A₁) monomer is at least one haloalkyl vinyl ether.

4. An alternating multicomponent copolymer according to claim 1, wherein the group (A₁) monomer is 2-chloroethyl vinyl ether.

5. An alternating multicomponent copolymer according to claim 1, wherein the group (A₂) monomer is isobutylene or propylene.

6. An alternating multicomponent copolymer according to claim 3, wherein the group (A₂) monomer is isobutylene or propylene.

7. An alternating multicomponent copolymer according to claim 4, wherein the group (A₂) monomer is isobutylene or propylene.

8. An alternating multicomponent copolymer according to claim 1, wherein the group (B) monomer is selected from acrylonitrile, acrylic compounds thiolacrylic compounds, α- or β-substituted acrylonitriles, α- or β-substituted acrylic compounds and α- or β-substituted thiolacrylic compounds.

9. An alternating multicomponent copolymer according to claim 1, wherein the (B) group monomer is an acrylic ester.

10. An alternating multicomponent copolymer according to claim 1, wherein the (B) group monomer is selected from methyl acrylate, ethyl acrylate, n-butyl acrylate and 2-ethylhexyl acrylate.

11. An alternating multicomponent copolymer according to claim 7, wherein the (B) group monomer is selected from methyl acrylate, ethyl acrylate, n-butyl acrylate and 2-ethylhexyl acrylate.

12. The alternating multicomponent copolymer of claim 1, wherein said (A₂) monomer is selected from the group consisting of ethylene, propylene, butene-1, isobutene, hexene-1, heptene-1, 2-methylbutene-1, 2-methylpentene-1, octadecene-1, 4-phenylbutene-1, styrene, α-methylstyrene, α-butylstyrene, 4-methylstyrene, vinylcyclobutane, vinylcyclohexane, isopropylbenzene, vinylnaphthalene, allylbenzene, vinyl chloride, vinyl bromide, allyl chloride, allyl bromide, allyl iodide, 4-chloro-butene-1, 3-chloro-butene-1, 3-bromo-pentene-1, 4-chloro-styrene, 4-iodo-styrene, 4-chlorovinylcyclohexane, 4-chloro-allylbenzene, 2,4-dichlorostyrene, 2,4-di-fluoro-styrene, 4-chloro-1-vinylnaphthalene, vinylidene chloride, vinylidene bromide, 2-chloro-propene-1, 1-bromo-1-chloroethylene, 2-chloro-allyl chloride, methallyl chloride, 1,1-bis-(4-chlorophenyl)-ethylene, butene-2, 2-methylbutene-2, hexene-2, hexene-3, 2-methylpentene-2, heptene-2, octadecene-2, γ-methallyl chloride, 1,5-dichloro-pentene-2, 1-chloro-3-methylbutene-2, 1-chloromethylbutene-2, α-methylstyrene, 4-phenylbutene-2, α,β-dimethyl-styrene, β,β-dimethylstyrene, 1,1-diphenylpropene-1, stilbene, α-methylstilbene, α-methyl-4-chlorostyrene, α-chloromethylstyrene, 2-propenylnaphthalene, 1-cyclohexylpropene-1, cyclopentene, cycloheptene, 1-methylcyclobutene-1, 4-chlorocyclohexene, indene, 2-bromoindene, 3-methylindene, dihydronaphthalene, acetonaphthalene, norbornene, 5-methylnorbornene, 5-phenylnorbornene, 5-chloronorbornene, 7-chloronorbornene, 2-methylnorbornene, γ-fenchene, bornylene, 5-chloromethylnorbornene, endocamphene, α-pinene, myrcenyl chloride, 1,3-butadiene, isoprene, 1,3-pentadiene, 1,4-pentadiene, 1,4-hexadiene, 1,5-hexadiene; 2,3-dimethyl-1, 3-butadiene; 11-ethyl-1, 11-tridecadiene; myrcene, 1,3,5-hexatriene, α-chloro-1,3-butadiene, 3-fluoro - 1,4 - hexadiene, p - divinylbenzene, p - isopropenyl styrene, diallylcyclohexane, trivinylcyclohexane, 4 - vinylcyclohexene-1, 2 - methylallylcyclopentene-1, 3 - allylindene, 4,7,8,9 - tetrahydroindene, bicyclo(4,2,0) - octadiene - 2,7 - fulvene, 1,3 - cyclopentadiene, 5 - chloro-1,3-pentadiene, 1,5-cyclooctadiene, 1,3,5-cycloheptatriene, Δ2,2'-dicyclopentenyl, dicyclopentadiene, 2,5-norbornadiene, 5-methylene-2-norbornene, 5-vinyl-2-norbornene, 5-isopropenyl-2-norbornene, 2-vinyl-1,4-endomethylene-1,2,3,4,5,5a,8,8a-octahydronaphthalene, limonene, and dipentene.

References Cited

UNITED STATES PATENTS

| | | | |
|---|---|---|---|
| 2,994,681 | 8/1961 | Hammon | 260—45.5 |
| 3,159,607 | 12/1964 | D'Alelio | 260—82.1 |
| 3,278,503 | 10/1966 | Serniuk | 260—82.5 |
| 3,578,636 | 5/1971 | Nakaguchi | 260—63 |

FOREIGN PATENTS

| | | | |
|---|---|---|---|
| 1,123,725 | 8/1968 | Great Britain | 260—63 |
| 1,487,211 | 5/1967 | France | 260—63 |

JOSEPH L. SCHOFER, Primary Examiner

C. A. HENDERSON, JR., Assistant Examiner

U.S. Cl. X.R.

260—79.7, 80.7, 80.72, 80.73, 80.76, 80.77, 80.8, 80.81